United States Patent [19]

Zimmerman et al.

[11] Patent Number: 5,514,387
[45] Date of Patent: May 7, 1996

[54] CALCIUM-ENRICHED BAKED GOOD PRODUCTION AND METHOD OF MAKING

[75] Inventors: Ellen L. Zimmerman, Morristown; Julia M. Carey, Madison; Louise Slade; Harry Levine, both of Morris Plains, all of N.J.

[73] Assignee: Nabisco, Inc., Parsippany, N.J.

[21] Appl. No.: 350,084

[22] Filed: Nov. 29, 1994

[51] Int. Cl.$^6$ .......................... A23L 1/035; A23L 1/304
[52] U.S. Cl. ................ 426/74; 426/19; 426/20; 426/549; 426/654; 426/661; 426/662
[58] Field of Search ................ 426/19, 20, 549, 426/661, 662, 654, 74

[56] References Cited

U.S. PATENT DOCUMENTS

| | | |
|---|---|---|
| 2,871,123 | 1/1959 | Bauer et al. . |
| 2,970,915 | 2/1961 | Ferrari . |
| 3,445,238 | 5/1969 | Eggen et al. ........................ 426/74 |
| 3,490,916 | 1/1970 | Henika . |
| 3,919,434 | 11/1975 | Tsen et al. . |
| 4,196,226 | 4/1980 | Benjamin et al. . |
| 4,396,635 | 8/1983 | Roudebush et al. . |
| 4,468,408 | 8/1984 | Bosco et al. . |
| 4,562,080 | 12/1985 | Tenn . |
| 4,668,519 | 5/1987 | Dartey et al. . |
| 4,673,583 | 6/1987 | Kuwata et al. . |
| 4,678,672 | 7/1987 | Dartey et al. . |
| 4,701,329 | 10/1987 | Nelson et al. . |
| 4,737,375 | 4/1988 | Nakel et al. . |
| 4,740,380 | 4/1988 | Melachouris et al. . |
| 4,765,996 | 8/1988 | Misaki et al. . |
| 4,777,045 | 10/1988 | Vanderveer et al. . |
| 4,784,871 | 11/1988 | Park . |
| 4,786,510 | 11/1988 | Nakel et al. . |
| 4,840,814 | 6/1989 | Harada et al. . |
| 4,851,243 | 7/1989 | Andersen et al. . |
| 4,859,473 | 8/1989 | Arciszewski et al. . |
| 4,871,554 | 10/1989 | Kalala et al. . |
| 4,904,485 | 2/1990 | Hirakawa et al. . |
| 5,066,499 | 11/1991 | Arciszewski et al. . |
| 5,080,921 | 1/1992 | Reimer . |
| 5,082,684 | 1/1992 | Fung . |
| 5,108,764 | 4/1992 | Craig et al. . |
| 5,120,561 | 6/1992 | Silva et al. . |
| 5,133,984 | 7/1992 | Murphy et al. . |
| 5,154,942 | 10/1992 | Hirschey et al. . |
| 5,160,759 | 11/1992 | Nomura et al. . |
| 5,176,927 | 1/1993 | Haarasilta et al. . |
| 5,186,965 | 2/1993 | Fox et al. . |
| 5,194,270 | 3/1993 | Cante et al. ........................ 426/74 |
| 5,200,215 | 4/1993 | Slade et al. . |
| 5,254,356 | 10/1993 | Busken . |
| 5,362,502 | 11/1994 | Slade et al. . |

FOREIGN PATENT DOCUMENTS

WO91/18514  12/1991  WIPO .

OTHER PUBLICATIONS

Atwell, et al., *The Terminology and Methodology Associated with Basic Starch Phenomena*, Cereal Foods World, vol. 33, No. 2, pp. 306–311 (1988).

*Primary Examiner*—Helen Pratt

[57] ABSTRACT

The calcium content of crackers and other baked goods is substantially increased without adversely affecting texture by the use of an emulsifier composition to reduce hardness and dry mouthfeel caused by increased levels of calcium. Exemplary amounts of the emulsifier composition for achieving tenderization of the calcium fortified crackers and other baked goods may be from about 3% by weight to about 45% by weight, based upon the weight of the calcium component. Calcium carbonate is the preferred calcium enrichment component. The amount of the calcium enrichment component for providing more than 10% of the U.S. R.D.A. of 1000 mg of calcium per 15 gram serving may be from about 3% by weight to about 30% by weight, preferably from about 5% by weight to about 15% by weight, based upon the total weight of the flour. For making conventional or full-fatted baked goods such as crackers, the calcium enriched doughs of the present invention contain effective emulsifying amounts of: a) at least one polyoxyethylene sorbitan fatty acid ester, preferably polysorbate 60, and b) at least one stearoyl lactylate, preferably sodium stearoyl lactylate. The reduced fat, low-fat, and no-fat calcium enriched doughs of the present invention most preferably additionally contain at least one lecithin. Other full-fat, reduced fat, low-fat, and no-fat baked goods may be fortified with calcium in accordance with the present invention include cookies, brownies, snacks, snack chips, bagel chips, Melba toast, pretzels, and the like.

36 Claims, No Drawings

CALCIUM-ENRICHED BAKED GOOD PRODUCTION AND METHOD OF MAKING

FIELD OF THE INVENTION

The present invention relates to the tenderization of calcium-enriched crackers and other baked goods produced on a mass production, continuous basis. The calcium fortified baked products produced in accordance with the present invention include conventional or full-fatted crackers, snacks, cookies, pretzels and snack chips, and reduced fat, low-fat, and no-fat baked goods.

BACKGROUND OF THE INVENTION

Calcium plays an important role in blood coagulation, nerve transmission, muscle contraction, and heart function. Protection against high blood pressure, colon cancer, and the degenerative bone disease known as osteoporosis have been attributed to calcium. Approximately one percent of the body's calcium circulates in the blood and the rest is present in bones and teeth. The U.S. Recommended Daily Allowance (R.D.A.) of calcium is 1000 mg for adults and children 12 or more years of age. The R.D.A for pregnant and lactating women is 1200 mg. However, the average calcium intake is only about one-third of the required daily allowance. If dietary sources of calcium do not provide sufficient amounts of calcium to the blood, calcium is depleted from the bones to compensate for the insufficient amounts. Age related bone loss and fracture rates in patients with osteoporosis may be reduced with high dietary intake of calcium.

The ability of different individuals to utilize the calcium in food may vary considerably. For example, a high protein diet may result in about 15% of the dietary calcium being absorbed. A low protein diet may result in only about 5% of the dietary calcium being absorbed. Phytic acid in cereal grains interferes with calcium absorption by forming insoluble calcium phytate in the intestine. Oxalates in foods, such as spinach and rhubarb, may similarly interfere with calcium absorption.

Other intestinal factors that influence the absorption of calcium include pH, the calcium:phosphorus ratio, the presence of free fatty acids which occurs when fat absorption is impaired, and the amount of vitamin D. Generally, the more alkaline the contents of the intestines, the less soluble are the calcium salts. Also, a high calcium:phosphorus ratio favors the formation of tricalcium phosphate rather than the more soluble, better absorbed forms. If either calcium or phosphorus is taken in excess, excretion of the other is increased. The optimal ratio is 1:1 when the intake of vitamin D is adequate. On the other hand, vitamin D promotes the absorption of calcium from the intestine.

Although milk has been a major source of calcium for infants and young children, many teenagers and adult Americans are consuming lesser amounts of it. The calcium content of milk and other beverages may be increased to facilitate meeting of the U.S. R.D.A. for calcium.

For example, calcium enrichment or fortification of milk is disclosed in U.S. Pat. Nos. 2,871,123, 4,701,329, 4,840,814, and 4,851,243. In U.S. Pat. No. 2,871,123 calcium carbonate is used as a calcium source in the production of a canned calcium-enriched concentrated milk product for dilution to make infant formula. Carrageenan gum is used for suspension of the calcium carbonate. U.S. Pat. Nos. 4,701,329 and 4,851,243 disclose the production of calcium-enriched and phosphorus- enriched fortified milk by the addition of tri-basic calcium phosphate, carrageenan and guar gum to fresh milk, effecting hydration of the gums, and assuring uniform distribution of the added materials in the milk. U.S. Pat. No. 4,840,814, discloses the preparation of calcium-enriched milk or toned milk by adding a water soluble calcium salt of an organic acid to thermally sterilized milk or toned milk, and adjusting the pH value of the obtained mixture to 6.6 or above.

Beverages and beverage concentrates nutritionally supplemented with solubilized calcium are disclosed in U.S. Pat. Nos. 4,737,375 and 4,740,380. In U.S. Pat. No. 4,737,375 the beverages and concentrates are substantially free of a sugar alcohol and contain specified levels of total edible acids selected from mixtures of citric, malic and phosphoric acid. U.S. Pat. No. 4,740,380 discloses a clear, calcium-fortified aqueous acidic beverage. The beverage comprises an aqueous solution of an organic calcium compound such as calcium gluconate at a pH of about 4 and below wherein the calcium compound content does not exceed the solubility limit of the compound in water. An inorganic calcium salt can be used alone or in combination with an organic calcium compound to form an acidic beverage provided the pH is adjusted with an organic acid.

However, when incorporating calcium into liquids, the source of calcium, usually an inorganic salt in finely divided form, tends to settle out upon extended storage. Also, the use of soluble sources of calcium or even the use of suspended sources of calcium tends to result in off flavors, adverse appearance, and undesirable increases in viscosity. Generally, the more soluble the salt or the more finely divided it is so as to improve suspendability, the quicker or more easily its taste will be detected. Also, solubilization of the calcium increases the likelihood of it being complexed with or interacting with other components of the beverage or of other foods consumed with it. The complexation or interaction of the calcium may result in it being less susceptible to absorption into the blood.

Calcium enrichment of other foods such as bean curd, yogurt, and cereal grains is disclosed in U.S. Pat. Nos. 4,676,583, 4,784,871, and 4,765,996, respectively. U.S. Pat. No. 4,676,583 discloses the production of an aseptic calcium-enriched soy bean curd by adding a calcium hydroxide-sucrose complex as coagulant to the soy bean milk, sterilizing the resulting mixture by heating, adjusting the pH value of the sterilized product to weakly acidic, charging the sterilized product into a container under an aseptic condition and sealing the opening of the container. The calcium hydroxide-sucrose complex is coagulated with the soybean milk by heating. When the calcium hydroxide-sucrose complex used as coagulant is insufficient to provide the required extent of calcium enrichment, calcium lactate may be added in an aseptic atmosphere after the sterilization process at the time of pH adjustment. According to U.S. Pat. No. 4,784,871 a calcium fortified yogurt is produced by adding an acid soluble calcium salt to fruit flavoring which is subsequently combined with a yogurt base. In U.S. Pat. No. 4,765,996 polished rice or barley is enriched with nutrients which are fixed in and on the grain by coating an oil/fat and/or a wax on the grains, coating the same with a hydrophilic emulsifier and further coating them with a starch-based coating agent.

Calcium compounds have been utilized in baked goods, such as crackers, as components of leavening agents, pH adjusters, yeast foods, and for their nutritive value. U.S. Pat. No. 4,196,226 discloses a leavening acid comprising alkali metal aluminum phosphate granules having a calcium rich outer surface for improving flow and dusting properties. The product may be used as a leavening acid in moist doughs, and liquid batters such as pancake batters. U.S. Pat. No. 4,678,672 to Dartey et al discloses the use of calcium and ammonium carbonates and bicarbonates in leavening systems for the production of reduced calorie crackers. Various emulsifiers are disclosed as replacements for fat. Magnesium and/or calcium carbonates are taught as acid-neutralizing constituents in British patent 335,214 for dough or flour compositions which contain persulphates and bromates. Calcium carbonate is disclosed as a bread improver in U.S. Pat. No. 2,970,915. It is also taught as a buffering agent for a liquid yeast brew in U.S. Pat. No. 3,490,916. The dough-up stage addition of calcium carbonate for its nutritive value in the production of reduced fat or no-added fat crackers, is disclosed in U.S. Pat. No. 5,108,764 to Craig. U.S. Pat. Nos. 4,859,473 and 5,066,499 to Arciszewski et al disclose the addition of calcium carbonate to the dough-up stage for its nutritive value in the production of low sodium crackers.

The delivery of dietary calcium using crackers and other low moisture content baked goods as a medium has significant advantages over the use of milk, other dairy products such as yogurt, beverages, tofu, and whole grains. Crackers generally exhibit much longer shelf lives than do dairy products such as milk and yogurt. Settling out of calcium salts from solution or suspension during product storage is not encountered when using crackers as a dietary source of calcium. Also, crackers and other baked goods have broad appeal to many segments of the population. However, commercially available crackers generally provide only up to about 3% of the U.S. R.D.A. of calcium per serving. It has been found that the incorporation of calcium in crackers in amounts to provide more than 10% of the U.S. R.D.A. of 1000 mg calcium per serving results in a hard cracker texture.

Also, reducing the fat content of crackers and other baked goods results in a harder texture as disclosed in copending, commonly assigned U.S. application Ser. No. 08/351,059 for "Tenderized Baked Good Production With Reduced Fat, Low-Fat, Or No Added Fat" filed Nov. 29, 1994 in the names of Ellen L. Zimmerman, Julia M. Carey, Louise Slade, and Harry Levine, which application is incorporated herein by reference in its entirety.

In the preparation of baked goods, fat lubricates and reduces viscosity of the dough. Fat retards starch from swelling, and from gelatinizing (including the second stage of gelatinization known as pasting). It also provides flavor and tenderness to the final product. Methods for making reduced fat, low-fat, or fat-free (no added fat) baked goods must somehow compensate for the multiple functions of fat when reducing or eliminating fat.

In producing crackers on a mass production basis, a cracker dough must be continuously sheetable, and it should preferably be capable of being laminated upon itself. The baked product should be non-brittle, so as to be transferable between conveyor belts and packaging equipment without excessive breakage.

Water can be used to reduce viscosity and to provide adequate lubrication to the dough in the absence of fat, but water cannot be used as the sole means to provide tenderness to the final product. Fat-free crackers made only with water as the fat replacement are flinty and so absorptive as to cause unpleasant dryness in the mouth upon eating.

As disclosed in U.S. Pat. No. 5,108,764 to Craig, et al., a major source of the textural problem in crackers is believed to be excessive gelatinization of starch in crackers made with extra water without adding fat. Excessive gelatinization of starch during baking makes the cracker flinty and very moisture-absorbent. Retention of water in the cracker dough during baking causes excessive gelatinization and the resultant inferior cracker. Thus, when preparing crackers, unlike preparing bread, starch gelatinization is to be limited. For example, in full-fatted crackers, 75% of the starch may be gelatinized. Removal of the fat may result in an increase of gelatinization to 85% or more, with a resultant cardboard-like texture.

In the process of U.S. Pat. No. 5,108,764, the added fat or shortening content of a mass-produced cracker is reduced using water and an enzyme composition that hydrolyses non-cellulosic cell wall polysaccharides. The enzymatic treatment and the amount of water are such so as to avoid excessive gelatinization during baking.

The use of various emulsifier systems to reduce fat in foods is disclosed in International Publication No. WO 91/18514, published Dec. 12, 1991, U.S. Pat. No. 5,254,356 to Busken, U.S. Pat. Nos. 4,678,672 and 4,668,519 to Dartey, et al., U.S. Pat. No. 5,080,921 to Reimer, U.S. Pat. No. 5,082,684 to Fung, U.S. Pat. No. 4,468,408 to Bosco, et al., U.S. Pat. No. 3,919,434 to Tsen, et al., U.S. Pat. No. 5,160,759 to Nomura, et al., and U.S. Pat. No. 5,154,942 to Hirschey, et al.

In embodiments of the present invention, an emulsifier composition is used to provide an unexpectedly soft and tender texture and enhanced flavor to calcium-enriched crackers and other baked products which provide more than 10% of the U.S. R.D.A. of 1000 mg of calcium per serving. The tenderized calcium fortified crackers and other baked goods of the present invention include calcium enriched reduced fat, low-fat, and no-fat baked products as well as conventional, full-fatted crackers and other baked goods which contain substantial amounts of ungelatinized starch. Dough lay times and dough machinability are not adversely affected, even though the doughs contain substantial amounts of calcium and even though their added fat level may be substantially reduced or completely eliminated.

SUMMARY OF THE INVENTION

The calcium content of crackers and other baked goods is substantially increased without adversely affecting texture by the use of an emulsifier composition to reduce hardness and dry mouthfeel caused by increased levels of calcium. Exemplary amounts of the emulsifier composition for achieving tenderization of the calcium fortified crackers and other baked goods may be from about 3% by weight to about 45% by weight, based upon the weight of the calcium component. In conventional or full-fatted crackers and other baked goods, emulsifier amounts at the lower end of the range are generally used. Exemplary amounts of the emulsifier for use in calcium enriched full fatted products may range from about 3% by weight to about 20% by weight, preferably from about 5% to about 15% by weight, based upon the weight of the calcium component. As the fat content of the baked good is reduced, generally higher amounts of the emulsifier may be used to reduce hardness caused by both calcium enrichment and fat reduction. For example, exemplary amounts of the emulsifier for use in calcium enriched no-fat crackers and other baked goods may range from about 15% by weight to about 45% by weight, based upon the weight of the calcium component. The calcium-enriched crackers and other baked goods of the present invention provide more than 10%, preferably at least 20% of the U.S. R.D.A. of 1000 mg of calcium per serving.

The source of calcium for providing calcium enrichment to the baked goods of the present invention is preferably an insoluble, tasteless or bland calcium salt which does not adversely affect pH, flavor, or color of the baked goods. In addition, the calcium component, added in the dough-up stage of fermented crackers or other fermented baked goods, preferably does not interfere with neutralization of acids produced during fermentation. Low solubility of the calcium component is preferred to reduce the risk of undesirable complexation or interaction with dough components such as gluten which may hinder dough machinability or which may reduce absorption of the calcium into the blood. Also, low solubility of the calcium component reduces its dissolution in the mouth during consumption of the baked good which reduces the detection of any off-flavors. Calcium carbonate is the preferred calcium component for enriching the calcium content of baked goods in accordance with the present invention. Exemplary amounts of the calcium enrichment component for providing more than 10% of the U.S. R.D.A. of 1000 mg of calcium per 15 gram serving are from about 3% by weight to about 30% by weight, preferably from about 5% by weight to about 15% by weight, based upon the total weight of the flour.

In preferred embodiments for making conventional or full-ratted baked goods such as conventional crackers, the calcium enriched doughs of the present invention contain effective emulsifying amounts of: a) at least one polyoxyethylene sorbitan fatty acid ester, preferably polysorbate 60, and b) at least one stearoyl lactylate, preferably sodium stearoyl lactylate. The ratio (b:a) of the weight of sodium stearoyl lactylate and/or other stearoyl lactylates to the weight of the polysorbate 60 and/or other polyoxyethylene sorbitan fatty acid ester components may be from about 4.65–0.5:1, preferably from about 3.5–1.15:1.

The reduced fat, low-fat, and no-fat calcium enriched doughs of the present invention most preferably contain effective emulsifying amounts of at least one of each of three emulsifier components as disclosed in said copending, commonly assigned U.S. application Ser. No. 08/351,059, for "Tenderized Baked Good Production With Reduced Fat, Low-Fat, Or No Added Fat" filed Nov. 29, 1994 in the names of Ellen L. Zimmerman, Julia M. Carey, Louise Slade, and Harry Levine. As disclosed therein, these emulsifier compositions contain at least one of each of the three emulsifier components: (1) polyoxyethylene sorbitan fatty acid esters, (2) lecithins, and (3) stearoyl lactylates. In preferred embodiments, the polyoxyethylene sorbitan fatty acid ester component is polysorbate 60, which is used with lecithin and sodium stearoyl lactylate. The amount of polysorbate 60 and/or other polyoxyethylene sorbitan fatty acid ester components may be at least about 15% by weight, preferably from about 20% by weight to about 40% by weight. The amount of lecithin may be at least about 5% by weight, preferably from about 10% by weight to about 25% by weight. The amount of sodium stearoyl lactylate and/or other stearoyl lactylates may be at least about 20% by weight, preferably from about 35% by weight to about 70% by weight. The percentages of the three emulsifier components, such as polysorbate 60, lecithin, and sodium stearoyl lactylate, add up to 100% by weight. The three component emulsifier compositions may also be used in the preparation of conventional or full-fatted calcium-enriched crackers and other full-fatted calcium enriched baked goods.

The emulsifier components, such as polysorbate 60, sodium stearoyl lactylate, and the optional lecithin may be premixed and then mixed with the flour, or they may be separately admixed with the flour. In preferred embodiments, the polysorbate 60 is present in or premixed with a natural flavorant, and then the premix is admixed with the flour.

The unexpectedly soft, tender, non-brittle texture of calcium enriched crackers of the present invention lasts for extended periods of time, for example, at least two months, preferably at least six months, in closed packaging. The emulsifier composition does not impart a soapy or off-flavor and the calcium component does not impart a chalky flavor or dry mouthfeel to the baked good. In preferred embodiments, cracker flavor is enhanced by the use of a natural flavorant.

The crackers produced in accordance with the present invention may be chemically leavened or unfermented full-fat, reduced fat, low-fat, or no-fat crackers. Fermented crackers, such as soda crackers, which are full-fatted or having reduced fat, low-fat or no added fat may also be produced in accordance with the present invention. Exemplary of other full-fat, reduced fat, low-fat, and no-fat baked goods which may be fortified with calcium in accordance with the present invention include cookies, brownies, snacks, snack chips, bagel chips, Melba toast, pretzels, and the like.

DETAILED DESCRIPTION OF THE INVENTION

The calcium content of crackers and other baked goods is substantially increased in accordance with the present invention by blending into a dough or batter at least one edible, preferably bland, insoluble calcium compound and an emulsifier composition to reduce hardness and dry mouthfeel caused by the incorporation of the calcium in the baked good. The emulsifier composition does not impart a soapy or off-flavor to the baked good, and it does not produce an excessively blistered surface. The unexpectedly soft, tender, non-brittle texture is exhibited for at least two months, preferably at least six months, in proper, air-tight packaging. In embodiments of the present invention the calcium level of conventional or full-fatted crackers, reduced fat crackers, low-fat crackers and no-fat crackers may be increased from approximately 0–3% of U.S. R.D.A. per 15 gram serving or reference amount to a product containing more than 10%, preferably at least 20% of U.S. R.D.A. of 1000 mg calcium in a 15 gram serving or reference amount. Similar levels of calcium enrichment may also be achieved in other full-fat, reduced fat, low-fat, and no-fat baked goods such as cookies, brownies, snacks, snack chips or chip-like products, bagel chips, Melba toast, pretzels, and the like.

The calcium component may be one or more edible acidic, neutral or basic inorganic or acid salts. Exemplary calcium components include calcium carbonate, tricalcium phosphate, calcium phosphate, calcium hydrogen phosphate, calcium dihydrogen phosphate, calcium hydroxide, calcium citrate, calcium malate, and mixtures thereof. Low solubility of the calcium component is preferred to reduce the risk of undesirable complexation or interaction with dough components such as gluten which may hinder dough machinability or which may reduce absorption of the calcium into the blood. Also, low solubility of the calcium component reduces its dissolution in the mouth during consumption of the baked product which reduces the detection of any off-flavors. The source of calcium for providing calcium enrichment to the crackers of the present invention is preferably an insoluble, tasteless or bland, alkaline calcium salt or compound which does not adversely affect pH, flavor, or color of the baked good. In addition, the calcium component, added in the dough-up stage of fermented crackers or other fermented baked goods, preferably does not interfere with the desired neutralization of acids produced during fermentation. Exemplary of edible, bland, insoluble calcium components which may be used in preferred embodiments of the invention are calcium carbonate, tricalcium phosphate, and mixtures thereof. Calcium carbonate is the most preferred calcium component for enriching the calcium content of crackers in accordance with the present invention.

A preferred source of calcium carbonate is ground, food grade limestone. The ground limestone may have a calcium carbonate content of at least about 94% by weight. It is generally obtained by crushing, grinding and classifying naturally occurring limestone (calcite), benefited by flotation and/or air classification. It is a white to off-white, microcrystalline powder, odorless, tasteless and stable in air. It is insoluble in water and alcohol. It is soluble in dilute acetic acid, dilute hydrochloric acid and in nitric acid. The ground limestone, as well as other calcium compounds utilized in the present invention, may have a particle size distribution of: a) less than or equal to about 0.2% by weight retained on a 200 mesh U.S. Standard Sieve, and b) at least about 90% by weight, preferably at least about 98% by weight, passing through a 325 mesh U.S. Standard Sieve.

Exemplary amounts of the calcium enrichment component, such as calcium carbonate, for providing more than 10% of the U.S. R.D.A. of 1000 mg of calcium per 15 gram serving are from about 3% by weight to about 30% by weight, preferably from about 5% by weight to about 15% by weight, based upon the total weight of the flour.

The emulsifier compositions used in the present invention to reduce hardness and dry mouthfeel preferably comprise effective emulsifying amounts of: a) at least one polyoxyethylene sorbitan fatty acid ester, preferably polysorbate 60, and b) at least one stearoyl lactylate, preferably sodium stearoyl lactylate. The ratio (b:a) of the weight of sodium stearoyl lactylate and/or other stearoyl lactylates to the weight of the polysorbate 60 and/or other polyoxyethylene sorbitan fatty acid ester components may be from about 4.65–0.5:1, preferably from about 3.5–1.15:1.

Additional emulsifiers, such as lecithin, mono- and/or di-glycerides, sorbitan monostearate, diacetyl tartaric acid esters of mono- and diglycerides, or mixtures thereof may be used provided they do not adversely affect flavor, appearance or texture, or calcium absorption. In full-fatted or conventional crackers or other baked goods which have not had their fat content substantially reduced, excessive use of emulsifiers may deleteriously affect dough machinability or baked good quality. For example, excessive use of emulsifiers may undesirably decrease cracker crispness, increase blistering, create a non-uniform cell structure, or provide excessive softness or fragility for mass packaging operations.

In producing calcium enriched reduced fat, low-fat, and no-fat baked goods the emulsifier compositions preferably contain at least one lecithin in addition to at least one polyoxyethylene sorbitan fatty acid ester, and at least one stearoyl lactylate, as disclosed in said copending, commonly assigned U.S. application Ser. No. 08/351,059, for "Tenderized Baked Good Production With Reduced Fat, Low-Fat, Or No Added Fat" filed Nov. 29, 1994 in the names of Ellen L. Zimmerman, Julia M. Carey, Louise Slade, and Harry Levine. As disclosed therein, the three-component emulsifier system is used to replace a portion or all of the oleaginous composition. The emulsifier combination provides an unexpectedly superior, soft and tender texture to reduced-fat, low-fat, and no-fat baked goods having substantial amounts of ungelatinized starch and relatively low moisture contents. As disclosed therein, these emulsifier compositions contain effective emulsifying amounts of at least one of each of the three emulsifier components: (1) polyoxyethylene sorbitan fatty acid esters, (2) lecithins, and (3) stearoyl lactylates. In preferred embodiments, the polyoxyethylene sorbitan fatty acid ester component is polysorbate 60, which is used with lecithin and sodium stearoyl lactylate. The amount of polysorbate 60 and/or other polyoxyethylene sorbitan fatty acid ester components may be at least about 15 % by weight, preferably from about 20% by weight to about 40% by weight. The amount of lecithin may be at least about 5% by weight, preferably from about 10% by weight to about 25% by weight. The amount of sodium stearoyl lactylate and/or other stearoyl lactylates may be at least about 20% by weight, preferably from about 35% by weight to about 70% by weight. The percentages of the three emulsifier components, such as polysorbate 60, lecithin, and sodium stearoyl lactylate, add up to 100% by weight. The three component emulsifier compositions may also be used in the preparation of conventional or full-fatted calcium-enriched and other baked goods.

Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Polysorbate 60 is preferred.

Polysorbate 60, polyoxyethylene (20) sorbitan monostearate, is a hydrophilic emulsifier which is a mixture of stearate and palmitate partial esters of sorbitol and sorbitol anhydrides condensed or copolymerized with approximately 20 moles of ethylene oxide ($C_2H_4O$) for each mole of sorbitol and its mono- and dianhydrides. It is a lemon- to orange-colored, oily liquid or semi-gel having a faint, characteristic odor and a warm, somewhat bitter taste. It is soluble in water, aniline, ethyl acetate, and toluene, but is soluble only at low levels in mineral and vegetable oils. Polysorbate 60 is commercially available under the trademark Tween 60 from ICI-Atlas.

Polysorbate 80, polyoxyethylene (20) sorbitan monooleate, is a hydrophilic emulsifier which is a mixture of oleate partial esters of sorbitol and sorbitol anhydrides condensed or copolymerized with approximately 20 moles of ethylene oxide ($C_2H_4O$) for each mole of sorbitol and its mono- and dianhydrides. It is a yellow- to orange-colored, oily liquid having a faint, characteristic odor and a warm, somewhat bitter taste. It is very soluble in water, producing an odorless, nearly colorless solution, and is soluble in ethanol, cottonseed oil, corn oil, methanol, ethyl acetate and toluene. Polysorbate 80 is commercially available under the trademark Tween 80 from ICI-Atlas.

Exemplary of the stearoyl lactylate component are alkali and alkaline-earth stearoyl lactylates such as sodium stearoyl lactylate, calcium stearoyl lactylate, and mixtures thereof. Sodium stearoyl lactylate is preferred.

Lecithin, or phosphatidylcholine, is a phosphatide found in all living organisms (plants and animals). Lecithin is a mixture of the diglycerides of stearic, palmitic, and oleic acids, linked to the choline ester of phosphoric acid. Examples of natural lecithins which may be used include those derived from plants such as soybean, rapeseed, sunflower, or corn, and those derived from animal sources such as egg yolk. Soybean-oil-derived lecithins are preferred.

Commercially available lecithin is preferred for use in the present invention. Commercial grades generally contain about 2.2% phosphorus. Lecithin is prepared commercially primarily from soybean oil. It exists preformed as a contaminant in crude soybean oil, and the commercial method of preparation involves precipitation from the oil and subsequent purification. It may be further processed by bleaching, fractionation, hydrolysis, acetylation, extraction, hydroxylation, and the like. Soybean lecithin may contain about 11.7% palmitic acid, about 4% stearic acid, about 8.6% palmitoleic acid, about 9.8% oleic acid, about 55% linoleic acid, about 4% linolenic acid, and about 5.5% $C_{20}$ to $C_{22}$ acids, including arachidonic acid.

Commercial grades of lecithin are classed according to total phosphatides, color, and fluidity. The amount of phosphatides in commercial lecithin generally ranges between about 54% and about 72%. The product specifications usually report the concentration of phosphatides as "per cent acetone-insolubles." Color is stated as unbleached, single bleached, and double bleached. The bleaching process tends to reduce the effectiveness of the lecithin as a surface-active material. The consistency will be "plastic" or "fluid".

Lecithin is available as a regular waxy solid or as "fluid," a molasses-like syrup. Fluidization may be attained by addition of 2–5% fatty acids and/or by mechanical means. The lecithin is a waxy mass when the acid value is about 20. It is a pourable, thick fluid when the acid value is around 30. The color of lecithin is nearly white when freshly made, but rapidly becomes yellow to brown in air. It may have an iodine value of about 95% and a saponification value of about 196. Lecithin is insoluble but swells in water and in NaCl solution, forming a colloidal suspension.

In preferred embodiments of the present invention, commercially available, fluidized, soybean-oil-derived lecithin is employed. Exemplary of a preferred fluid lecithin is an unbleached lecithin, derived from the phosphatides of phospholipids of soybean oil, which is semi-solid but pourable at room temperature. The Brookfield viscosity at 77° F. of the oil-based product may be about 5500 (±200) cps, and it may be light tan to yellow in color. The moisture content of the fluid lecithin may be less than or equal to 1% by weight, and its acetone-insoluble matter (phosphatides) may be at least 62% by weight. The hexane-soluble matter may be 0.3% by weight maximum, and the acid value may be 32 maximum.

Exemplary amounts of the emulsifier composition for achieving tenderization of the calcium fortified crackers or other baked goods may be from about 3% by weight to about 45% by weight, based upon the weight of the calcium component. In conventional or full-fatted baked goods, emulsifier amounts at the lower end of the range are generally used. Exemplary amounts of the emulsifier composition for use in calcium enriched full fatted products may range from about 3% by weight to about 20% by weight, preferably from about 5% to about 15% by weight, based upon the weight of the calcium component. As the fat content of the baked good is reduced, generally higher amounts of the emulsifier composition may be used to reduce hardness caused by both calcium enrichment and fat reduction. For example, exemplary amounts of the emulsifier for use in calcium enriched no-fat baked goods such as crackers, may range from about 15% by weight to about 45% by weight, based upon the weight of the calcium component.

The emulsifier components, such as polysorbate 60, soybean lecithin, and sodium stearoyl lactylate, may be incorporated into the dough separately or as a premix. They are preferably separately added to the flour. In embodiments of the invention, the emulsifier components may be used in a total amount of from about 0.15% by weight to about 2.5% by weight of the total amount of flour used to form the machinable dough or batter. Generally, as the calcium content is increased and the fat content is decreased, the amount of emulsifier used to obtain a soft, tender texture may be increased.

The emulsifier components may be premixed with, or present in, other dough or batter ingredients, such as a flavorant. In preferred embodiments, a natural flavorant is premixed with polysorbate 60, wherein the polysorbate 60 serves as a carrier, alone or with other carriers, for the flavorant to enhance flavor of the baked product. The polysorbate may, for example, amount to about 20–35% by weight of the total flavorant composition.

The three component emulsifier system used to replace a portion or all of the oleaginous composition provides an unexpectedly superior, soft and tender texture to reduced-fat, low-fat, and no-fat baked goods having substantial amounts of ungelatinized starch and relatively low moisture contents. The emulsifier composition increases the tenderness and softness of the baked good and increases the air-holding capacity, the lubricity, lay time, and machinability of the dough, which would otherwise be diminished by the lower levels of oleaginous composition and higher levels of water. In embodiments of the invention, calcium enriched baked goods in which about 15% or more of the starch is ungelatinized may have their fat content substantially reduced or even eliminated, without substantially adversely affecting dough machinability or baked-good texture, appearance, taste, and shelf-life. In preferred embodiments, the percentage of ungelatinized starch approaches or is substantially the same as that of the full-fatted product.

By interacting with water, the emulsifier composition provides a liquid phase which provides lubricity and air-entrapment capability to the dough. It also helps to reduce excessive starch gelatinization during baking. This avoids a hard, flinty texture in the relatively low moisture-content baked product. The emulsifier composition does not impart a soapy or off-flavor to the baked good, and it does not produce an excessively blistered surface. The unexpectedly soft, tender, non-brittle texture is exhibited for at least two months, preferably at least six months, in proper, air-tight packaging.

Generally, starch gelatinization occurs when: a) water in a sufficient amount, generally at least about 25 to 30% by weight, based upon the weight of the starch, is added to and mixed with starch and, b) the temperature of the starch-water mixture is raised to at least about 80° C. (176° F.), preferably 100° C. (212° F.) or more. The gelatinization temperature depends upon the amount of water available for reaction with the starch. The lower the amount of available water, generally, the higher the gelatinization temperature. Gelatinization may be defined as the collapse (disruption) of molecular order within the starch granule, manifested in irreversible changes in properties such as granular swelling, native-crystallite melting, loss of birefringence, and starch solubilization. The point of the initial stage of gelatinization and the range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granule. See Atwell et al, "The Terminology And Methodology Associated With Basic Starch Phenomena," *Cereal Foods World*, Vol. 33, No. 3, Pgs. 306–311 (March 1988).

The emulsifier composition, it is believed, complexes with amylose, which is mobilized and made available during the first stage of starch gelatinization. In the second stage of gelatinization, or during pasting, the amylose is hindered from pasting because it is complexed with the emulsifier composition. As a result, the overall extent of starch gelatinization is hindered by the formation of the complex or complexes. Adverse effects on texture of baked goods which would otherwise result from excessive gelatinization in the presence of water during baking are thereby avoided.

As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

Oleaginous compositions which may be used to obtain the calcium fortified full-fat, reduced-fat or low-fat baked goods of the present invention may include any known shortening or fat blends or compositions useful for baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, or non-digestible fats, fat-substitutes, or synthetic fats, such as sucrose polyesters, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise purified soybean oil in which the lecithin has been removed during purification. The shortening or fat content of the calcium enriched cracker doughs of the present invention may range from about 0 to about 40% by weight, based upon the weight of the dough. The shortening or fat content of the calcium enriched cracker doughs is generally less than about 12% by weight, based upon the weight of the dough.

The flour component or farinaceous materials may be any comminuted cereal grain or edible seed or vegetable meal, derivatives thereof and mixtures thereof. Exemplary of the flour component or farinaceous materials which may be used. are wheat flour, corn flour, corn masa flour, oat flour, barley flour, rye flour, rice flour, potato flour, grain sorghum flour, tapioca flour, graham flour, or starches, such as corn starch, wheat starch, rice starch, potato starch, tapioca starch, physically and/or chemically modified flours or starches, such as pregelatinized starches, and mixtures thereof. The flour may be bleached or unbleached. Wheat flour or mixtures of wheat flour with other grain flours are preferred. The amount of flour used in the compositions of the present invention ranges, for example, from about 30% by weight to about 80% by weight, preferably from about 45% by weight to about 75% by weight, based upon the weight of the dough. Unless otherwise indicated, all weight percentages are based upon the total weight of all ingredients forming the doughs or formulations of the present invention, except for inclusions such as flavor chips, nuts, raisins, and the like. Thus, "the weight of the dough" does not include the weight of inclusions.

The flour may be replaced in whole or in part by flour substitutes or bulking agents, such as polydextrose, hollocellulose, microcrystalline cellulose, mixtures thereof, and the like. Corn bran, wheat bran, oat bran, rice bran, mixtures thereof, and the like may also be substituted in whole or in part for the flour, for making a fiber-enriched product, to enhance color, or to affect texture.

Corn flour and/or wheat bran may be used, for example, to enhance color and affect texture. Exemplary amounts range up to about 15% by weight corn flour and up to about 20% by weight wheat bran, the percentages being based upon the total weight of ingredients forming the dough. In preferred embodiments of the invention, the corn flour and wheat bran may each comprise from about 1 to about 10% by weight, based upon the weight of the dough.

Process-compatible ingredients, which can be used to modify the texture of the products produced in the present invention, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Fructose is the preferred reducing sugar, because of its ready availability and its generally more enhanced browning and flavor-development effects. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to promote chewiness in the baked product.

In addition to the humectant sugars, other humectants, or aqueous solutions of humectants which are not sugars or possess a low degree of sweetness relative to sucrose, may also be employed in the dough. For example, glycerol, sugar alcohols such as mannitol, maltitol, xylitol and sorbitol, and other polyols, may be used as humectants. Additional examples of humectant polyols (i.e. polyhydric alcohols) include glycols, for example propylene glycol, and hydrogenated glucose syrups. Other humectants include sugar esters, dextrins, hydrogenated starch hydrolysates, and other starch hydrolysis products.

In embodiments of the present invention, the total sugar solids content, or the texturizing ingredient content, of the doughs of the present invention may range from zero up to about 50% by weight, based upon the weight of the dough.

The moisture contents of the doughs of the present invention should be sufficient to provide the desired consistency to enable proper forming, machining, and cutting of the dough. The total moisture content of the doughs of the present invention will include any water included as a separately added ingredient, as well as the moisture provided by flour (which usually contains about 12% to about 14% by weight moisture), and the moisture content of other dough additives included in the formulation, such as high fructose corn syrup, invert syrups, or other liquid humectants.

Taking into account all sources of moisture in the dough or batter, including separately added water, the total moisture content of the doughs or batters of the present invention is generally less than about 50% by weight, preferably less than about 35% by weight, based upon the weight of the dough or batter. The cracker doughs of the present invention generally have a moisture content of about 25% by weight to about 33% by weight, based upon the weight of the dough. Cookie doughs of the present invention may have a moisture content of less than about 30% by weight, generally from about 10% by weight to about 20% by weight, based upon the weight of the dough.

Preferably, minimal amounts of water are used to form the dough, so as to limit starch gelatinization. In embodiments of the present invention, the water content of a full-fat, reduced-fat, low-fat, or no-fat cracker dough may be reduced: a) without substantially increasing the viscosity or consistency of the dough, and b) without substantially increasing the gelatinization of the starch, compared to the full-fat, reduced-fat, low-fat, or no-fat dough which does not contain the emulsifier system. Exemplary reductions in the dough water content may range from about 4% by weight to about 15% by weight of the water used in the dough without the emulsifier system.

In addition to the foregoing, the doughs of the invention may include other additives conventionally employed in crackers and cookies. Such additives may include, for example, milk by-products, egg or egg by-products, cheese, cocoa, vanilla or other flavorings, as well as inclusions such as nuts, raisins, coconut, flavored chips such as chocolate chips, butterscotch chips and caramel chips, and the like in conventional amounts.

A source of protein, which is suitable for inclusion in baked goods, may be included in the doughs of the present invention to promote Maillard browning. The source of protein may include non-fat dry milk solids, dried or powdered eggs, mixtures thereof, and the like. The amount of the proteinaceous source may, for example, range up to about 5% by weight, based upon the weight of the dough.

The dough compositions of the present invention may contain up to about 5% by weight of a leavening system, based upon the weight of the dough. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, mixtures thereof, and the like. Yeast may be used alone or in combination with chemical leavening agents.

In embodiments of the present invention, enzymatic treatment may be used to alter the water-holding non-cellulosic, cell-wall polysaccharides such as pentosans and/or beta-glucans in the dough environment. Pentosans, for example, hold a lot of water, even though they amount to only a minor fraction of the dough. Hydrolyzing the pentosans, or other hemicelluloses so they permit release of water from the dough before the starch gelatinization temperature is reached during baking, helps to lower the amount of gelatinization of starch. Water released from the pentosans, but not from the dough during baking, may interact with the emulsifier composition. This may contribute to, or provide a portion of, the liquid phase which lubricates the dough and entraps air.

The enzymes may be used at temperatures and pH conditions normally recommended by their manufacturers, or at conditions which are optimal for pentosanase or other hemicellulase activities. The enzymes may be acidic, neutral, or alkaline. Exemplary commercially available enzyme preparations which may be used in the present invention are: (1) PEN #3 Liquid Concentrate; manufactured by Quest International Bioproducts Group, 1833 57th Street, Sarasota, Fla., and 2) Multifect XL and Cytolase 123 (also known as GC123), manufactured by Genencor, Inc., 180 Kimball Way, South San Francisco, Calif. 94080. These enzyme preparations are cellulases from the microorganism *Trichoderma reesei*, which possess powerful pentosan-degrading activity. They are believed to comprise endo-cellulase, beta-glucanase, pentosanase, and beta-glucosidase. According to Genencor literature, when GC123 is evaluated in cereal grain applications, the enzyme should be added at about 0.2 percent w/w based on grain. It is indicated that, in many applications, this dosage can be substantially reduced. It is further indicated that optimal operating pH for the important activities in GC123 is generally centered around pH 4.8, and that considerable flexibility exists. Typically, it is reported, pH adjustment is not required when treating cereal grains suspended in tap water (pH approximately 6.2). According to the Genencor literature, optimal activity is generally found at about 50° to 60° C. (122° to 140° F.). The enzymes, it is stated, are also active at lower temperatures, but work less quickly. Higher temperatures (to approximately 70° C.) may be used for short incubation times, but the activity is soon lost due to thermal inactivation.

The pentosanase content of hemi-cellulase enzymes is preferably measured as xylanase units of activity (XAU). The assay principle is this: xylanase activity is determined by the manufacturer with a simple colorimetric assay. A commercially available, soluble, dyed xylan is hydrolyzed, and the small molecular weight fragments are not precipitated by ethanol, leaving a colored supernatant. Xylanase activity of PEN #3 concentrate, for example, is about 10,250±750 XAU/ml. Exemplary amounts of the enzyme composition used in the present invention may range from about 200 to about 1500 XAU/lb flour, preferably from about 900 to about 1300 XAU/lb flour.

The enzyme may be added in liquid or powdered form. Liquid forms which have been diluted with water are preferred for facilitation of homogeneous distribution throughout the dough. Exemplary amounts of the enzyme composition used in the present invention, presented in aqueous solution, may be about 0.1% by weight to about 0.4% by weight of solution, based on the total weight of the flour. The enzyme solution may be prepared by admixing about 1 part by weight of enzyme concentrate with about 9 parts by weight of water.

Enzymes have optimal environments in which they function best. Care should be taken, with regard to enzyme treatment, to create a suitable environment for the enzyme. The pH of certain leavening agents is high, so they preferably should not be admixed with the enzyme in a concentrated manner. For example, in producing an unfermented cracker, the leavening agent is preferably well dispersed with the other ingredients, prior to the addition of the enzyme.

The machinable calcium enriched, full-fat, no-fat, low-fat, and reduced-fat doughs of the present invention are continuously sheetable using counter-rotating rolls. The cracker dough sheet can be continuously laminated upon itself to form from 3 to 8 laminae, for example. The laminated cracker doughs are capable of being reduced in thickness by counter-rotating rolls, to obtain a sheet which may be cut into pieces by reciprocating or rotary cutters, for example. Plastic cutters, such as nylon or polycarbonate cutters, or plastic-coated steel cutters, such as Teflon-coated steel cutters, may be used to reduce dough adherence. Conventional cracker manufacturing equipment, such as gauge rollers, laminators, and cutters, may be used in the present invention.

The calcium enriched cookie doughs may be sheeted by counter-rotating rollers and cut into pieces by rotary or reciprocating cutters. The cookie doughs may also be formed into pieces by wire-cutting or rotary-molding.

In embodiments of the present invention, the machinable full-fat, no-fat, low-fat, and reduced-fat or shortening-content doughs may have an LFRA value of about 100 grams to about 1200 grams, preferably from about 400 grams to about 800 grams. LFRA is an acronym for Leatherhead Food Research Association, the manufacturer of a texture analyzer. As used herein, the LFRA value represents the resistance of the dough to deformation by a 0.5"-diameter ball probe moving at a constant rate of 2 millimeters per second for a set distance of 15 millimeters into the dough.

The baked products of the present invention have a relative vapor pressure ("water activity") of less than about 0.7, preferably less than about 0.6, to assure microbial shelf-stability. The water content of the cracker, snack, snack or fabricated chip, pretzel, bagel chip, and Melba toast products is generally less than about 6% by weight, for example, from about 0.25% by weight to about 4% by weight, based upon the weight of the baked product, exclusive of inclusions. The pH of the calcium enriched crackers may generally be from about 6.4 to about 8.8.

Cookie, brownie and cake products generally have a moisture content of less than about 20% by weight, for example, from about 2% by weight to about 9% by weight for cookies, based upon the weight of the baked product, exclusive of inclusions.

Starch gelatinization (measured by differential scanning calorimetry) in the baked products of the present invention may generally be less than about 80% for crackers and snacks and less than about 10% for cookies.

Fermented Cracker Production

Conventional or full-fat calcium enriched crackers and fat-free, reduced-fat, and low-fat fermented calcium enriched crackers are produced using a sponge stage and a dough-up stage. The basic ingredients in the preparation of a sponge are flour and water. The fermentation agents are yeast and bacteria. The yeast, flour, and the surfaces of the trough in which the sponge is formed can serve as sources of microflora. It is preferable to use a starter or inoculum from a previous batch of sponge to serve as a source of bacteria. A sponge flour is generally relatively strong, unbleached, with an ash content of 0.39 to 0.49%. It may have a protein content of about 7.5 to 13.0% and an acid viscosity value in the range of about 60° to 90°M. A sponge may be produced by combining the flour, water, yeast, and bacterial source in a mixer, such as a spindle mixer or upright mixer.

It is preferable to add all of the water in the sponge-forming stage, to avoid an extra step in the dough-forming stage. However, a portion of the water may be added to the sponge in the dough-forming stage, in a manner which avoids disturbing the substantially uniform distribution of the leavening agents.

Exemplary relative amounts of the ingredients, which may be used in the formation of the sponge, are from about 60 to about 70% by weight flour, from about 25 to about 35% by weight water, from about 0.05 to about 1% by weight yeast, from about 0 to about 2% by weight diastatic malt or proteolytic enzyme, from about 0 to about 2% by weight yeast food, from about 0 to about 3% by weight of cracker meal, and from about 0 to about 2% by weight of starter or ferment. All percentages are based upon the total weight of the ingredients used to form the sponge. Known buffers can be added as needed to obtain a pH of about 5 to about 6.5 at the start of the fermentation. Various flours can be used, such as wheat, oat, rice, graham and mixtures thereof, but wheat flour or mixtures thereof with one or more other flours are preferred.

Fermentation times (also referred to herein as sponge times) are those conventionally used in the art. In the case of soda crackers or saltines, and the many variants of these products, such as oyster (soup) crackers, club crackers, cheese crackers, and the like, sponge times of about 2 to 24 hours are typically used.

In preparing the sponge, no special order of mixing is required. Conventional processes can be used. Generally, the flour is dumped into a trough, a portion of the water containing dispersed yeast and buffer is added, the remaining ingredients of the sponge are added, and then the balance of the water is added. The sponge ingredients are mixed until substantial homogeneity is achieved.

When doughing-up the sponge, dough ingredients for mixing into the fermented sponge generally include flour and sodium bicarbonate. In producing full-fat, reduced-fat or low-fat crackers, the shortening or fat may also be added in the dough-up stage. The addition of fat or shortening in the preparation of the sponge may decrease fermentation activity. Minor amounts of water, sodium chloride, ammonium bicarbonate, and/or other leavening agents and pH adjusting agents may be added in the dough-up stage. The calcium component, such as calcium carbonate, for fortifying the products of the present invention with calcium is added in the dough-up stage so as not to interfere with the fermentation in the sponge stage. It is preferable to include all of the water as an ingredient of the sponge. The dough-up flour may generally be weaker than the sponge flour, and may typically have an ash content of about 0.45%, and an acid viscosity value of about 40° to 60°M. Wheat flour and mixtures thereof with at least one other flour are preferred.

The relative amounts of the sponge ingredients to the dough ingredients may generally be such that the weight-percent of flour used to form the sponge is from about 60% to about 75% by weight of the total amount of flour which is used.

The emulsifiers used in the present invention are added in the dough-up stage, so as to ensure maximum fermentation. The liquid or "wet" emulsifiers, such as fluidized lecithin and polysorbates, are preferably added on the surface of the sponge, prior to flour addition. Keeping the "wet" ingredients in contact with the sponge minimizes lumping, as could otherwise occur if these ingredients were added on top of the flour in the dough-up stage. The stearoyl lactylates may be added on top of the dough-up flour, along with other dry ingredients such as salt, leavening agents, and the calcium component. Any shortening or fat included in the formulation may be added last.

Hemicellulases may be added during sponge preparation, during sponge fermentation, or at a later time. However, adding the hemicellulase at dough-up is preferred, to avoid the possibility of interference with the sponge-fermentation process. For example, pentosanase is preferably added to the surface of the sponge, in a solution for even dispersion and avoidance of lumping, prior to flour addition. When, for example, pentosanases are used which work best at pH's of about 4.5 or 5, alkaline leavening agents, e.g. sodium bicarbonate, and alkaline calcium components preferably should be maintained separate from the pentosanases for as long as possible, to obtain consistently optimal results.

The dough-up ingredients and the sponge are then mixed to obtain a dough of substantial homogeneity. After mixing, the dough is proofed, or allowed to ferment further, as is conventional in the cracker art. The viscosity of the dough is also decreasing during this time. Typical proofing times range from about 2 hours to about 5 hours, most typically about four hours. Generally, the temperature of the sponge before doughing, the temperature of the dough after doughing, and the temperature of the dough at the dough-forming machine are substantially the same.

The proofed dough is machined and baked in the conventional manner for the preparation of fermented crackers. Soda crackers, for example, may be formed from a continuous sheet of dough which is laminated or lapped before being cut. The dough pieces are formed by a stamping device, such as a reciprocating cutter or rotary cutter, which does not entirely sever the individual crackers from the sheet. The crackers remain in a substantially continuous sheet through the band oven. The cutter may also puncture the dough pieces to form docker holes for the prevention of uneven or excessive expansion in the oven. After baking, the individual crackers are separated from the substantially continuous sheet. The optional topping salt is generally applied after stamping and before baking.

The baked product is generally dried during the baking step or in a subsequent drying step to a moisture content of about 2% to about 4% by weight, based upon the final weight of the cracker. In embodiments of the invention optional topping or spray oil may be applied to the baked product.

A problem may arise with the shelf-life of fat-free crackers. They can go rancid more rapidly than crackers made with fat. This is believed to be because fat or shortening retards oxygenation and peroxide formation at points of unsaturation in naturally occurring grain lipids. Lipids are naturally present in grains such as wheat and wheat products such as flour. It is these lipids which can go rancid when fat-free crackers are made. At some point in the process, an antioxidizing agent such as naturally occurring anti-oxidants, including citric acid or tocopherols, or BHT, BHA or TBHQ, or mixtures thereof, can be added to prevent rancidity.

Unfermented Cracker Production

In preparing full-fat, no-fat, low-fat, and reduced-fat, unfermented calcium enriched crackers by the method of the present invention, the ingredients used may be basically the same as when preparing fermented crackers, except that no yeast or bacteria is employed. Thus, the ingredients of the dough may comprise flour, water, optional shortening or fat, sodium bicarbonate and a food-grade acidic compound to effect leavening. Proteolytic, amylolytic, and pentosanase enzymes may be used. The flour used in unfermented crackers does not generally need to be as strong as the sponge flour used in fermented crackers, although the flour should be moderately strong. Advantageously, the dough used to prepare the unfermented crackers comprises malt.

In addition to the aforementioned ingredients, doughs used to prepare unfermented crackers of the snack type by the method of the present invention may contain one or more sugars. For example, the sugar may be added as a mixture of sucrose with at least one humectant sugar, such as high fructose corn syrup, corn syrup, or glucose syrup. Exemplary amounts of the sugars used per 100 parts by weight of flour in the dough may be from about 4 to about 12 parts by weight of sucrose and from about 1 to about 5 parts by weight of one or more humectant sugars.

When producing unfermented crackers by the method of the present invention, the conventional mixing steps of a creaming stage followed by a dough-up stage may be employed. In the creaming stage, all the ingredients, including the emulsifiers of the present invention, may, for example, be creamed, except for the wheat flour, calcium component of the present invention, leavening agents, liquid pentosanase, and a portion of the water. In the dough-up stage, the flour may be added, followed by the leavening agents and optional enzymes, added, with the remaining water on top of the flour. The calcium component is preferably added in the dough-up stage. In embodiments of the invention, the calcium component or a portion thereof may be added in the creaming stage. To ensure uniform distribution of the minor ingredients throughout the dough, the flour added in the dough-up stage is preferably distributed substantially uniformly over the surface of the substantially homogeneous mixture formed in the creaming stage. The dough is generally proofed for about 0.5 to about 4.0 hours, although longer and shorter times are possible. The dough may then be sheeted, optionally laminated, then cut and baked. The final moisture content may, for example, be less than about 2.5% by weight.

Cookie Production

The calcium enriched cookie doughs or batters of the present invention may be prepared by admixing any shortening or fat with the sugars, flavorings, gums, emulsifiers, and other texturizing ingredients in a conventional upright dough-mixer to obtain a substantially homogeneous mixture. Water, and wheat flour or other flours, and the calcium component may then be admixed with the substantially homogeneous mixture in a second mixing stage. Preservatives and leavening agents may be added in the first or second mixing stage. In embodiments where a humectant is used, it may be conveniently mixed in during the first mixing stage of the dough preparation. The humectant, and at least part of any sucrose which is used, may also be conveniently admixed with the ingredients in a third mixing stage to obtain a substantially homogeneous, pourable batter or dough.

In embodiments of the present invention, the total sugar-solids content, or the texturizing ingredient content, of the cookie doughs, batters, or dough-like mixtures of the present invention may, for example, be at least about 10% by weight, and may, for example, go up to about 50% by weight, based upon the weight of the dough, batter, or dough-like mixture (exclusive of inclusions).

On the basis of 100 pounds of the total amount of flour component in the cookie dough or batter, a humectant, plus any sucrose or other sweetener employed (e.g. artificial sweeteners) in the formulation, may be present in amounts ranging from about 25 to about 175 pounds, depending on the degree of sweetness and humectant properties desired in the baked product.

If flavor chips or fruit pieces are to be added to the cookie dough or batter, they are preferably added, as the last ingredient, to the dough with minimal mixing, so as to avoid smearing of the flavor chips or pieces into the dough or batter.

The doughs or batters are generally prepared at a temperature of less than about 115° F. They may be cooled using ice as a portion of the added water. Solid or liquid carbon dioxide may also be used to cool the dough or batter. Exemplary dough or batter temperatures may range from about 60° F. to about 77° F. Before being shaped or extruded, the dough or batter may be permitted to lay for about 20 minutes to about 120 minutes to hydrate and achieve optimum consistency, in order to control oven spread and to facilitate transfer and forming operations.

The doughs or batters may be shaped or formed into pieces using conventional cookie-dough-forming and shaping-equipment. For example, the doughs may be sheeted between counter-rotating rollers and cut using rotary or reciprocating cutters. They may be formed into pieces by wire-cutting, rotary-molding, enrobing, encrusting, and the like.

In embodiments of the present invention, a calender press, an extruder, or continuous mixer may be utilized to form the dough or dough-like mixture into a continuous rope. Preferably, the screws of the extruder will be co-rotating, i.e., rotating in the same direction. Co-rotating twin-screw elements generally provide thorough mixing and conveying of the components, with the elements of one screw continuously wiping the other screw. This is particularly advantageous when the composition being mixed has a relatively high viscosity.

Suitable extruders which may be used in the present invention include: (1) WENGER model series TX by Wenger of Sabetha, Kans., (2) model series MPF by Baker Perkins, (3) model series BC by Creusot Loire of Paris, France, and 4) model series ZSK or Continua by Werner and Pfleiderer. Single-screw extruders, including those with a screw that oscillates horizontally during rotation (i.e. a Buss kneader by Buss of Pratteln, Switzerland), may also be used in accordance with the present invention.

A continuous mixer for use in the present invention comprises co-rotating screws and jacketed barrels with heating and/or cooling means. A continuous mixer is similar in construction to a cooker-extruder, except that for the same screw diameter, a continuous mixer has a greater free internal volume and thus operates to mix and convey ingredients at relatively lower pressures and shear than does an extruder, to obtain a substantially homogeneous output. A continuous mixer which may be used is model ZPM-120 by Werner and Pfleiderer.

Filled products may be produced in accordance with the present invention by coextruding the dough, batter, or dough-like mixture with filler materials. The co-extrudate may be formed by the use of a concentric die or a tube inserted within the die orifice. Filled products may also be produced by transporting the dough-like mixture to a conventional enrobing or encrusting machine, such as produced by the Rheon Manufacturing Company, for filling with a filler material. The filled dough pieces may have a weight ratio of the filler to the casing dough within the range from about 0.4–1.6:1.

Examples of fillers which may be used include chocolate-, vanilla-, butterscotch-, fruit-, peanut butter-, and cheese-flavored fillings. The filling material may also be a separately produced dough or batter, for the production of multi-flavored, multi-colored, or multi-textured cookie products. The preferred fillers for use in the present invention are low-fat or fat-free fillers. The fillers may be uncooked or cooked prior to co-extrusion with the doughs of the present invention. Exemplary fillers which may be used are disclosed in U.S. Pat. No. 4,562,080.

The cutting of dough ropes or extrudates before or after baking may be performed by a guillotine-cutter, a band-cutter, fluid-jet cutter, or the like.

The time and temperature of baking are adjusted in accordance with conventional techniques, to provide a shelf-stable moisture content. For example, in crisp variety cookies, the moisture content may be less than about 5% by weight. Soft cookies, cakes and brownies may have higher moisture contents. For example, the soft baked products may have moisture contents of about 5% to 10% by weight or more, based upon the weight of the baked good, inclusive of fillers and inclusions such as flavor chips, raisins and fruit pieces. For example, a fruit-filled, soft, moist cookie or cake may have a moisture content of about 15% by weight or more, based upon the total weight of the cookie. Moisture contents may be determined by first grinding the cookies or other baked product and then using conventional moisture-analysis techniques on the ground sample. Exemplary of such techniques are Brabender (set at 145° C., for 12 minutes) analysis or vacuum-oven (set at 70° C., for 24 hours) analysis, with appropriate correlation. In embodiments of the invention, the reduced-fat, no-fat or low-fat products may exhibit a cookie crumb-like structure, appearance, texture and structural integrity. Starch gelatinization (measured by differential scanning calorimetry) in cookie products of the present invention may be less than about 10%.

The cookie doughs and/or fillers may include antimycotics or preservatives, such as calcium propionate, potassium sorbate, sorbic acid, and the like. Exemplary amounts may range up to about 1% by weight of the dough or filler, to assure microbial shelf-stability. While baking times and temperatures will vary for different dough or batter formulations, oven types, etc., in general, commercial cookie-, brownie- and cake-baking times may range from about 5 minutes to about 15 minutes, and baking temperatures for cookies, brownies, and cakes may range from about 250° F. (121° C.) to about 600° F. (315° C.).

The cookie dough or batter compositions of the present invention may be used for the production of bar-type cookies, drop-type cookies such as chocolate chip cookies, oatmeal cookies, sugar cookies, fruit cookies, sandwich cookies, brownies, and the like.

The present invention is further illustrated in the following examples, where all parts, ratios, and percentages are by weight, and all temperatures are in ° F., unless otherwise stated:

EXAMPLE 1

The ingredients and their relative amounts, which may be used to produce a calcium enriched, full-fat or conventional, fermented cracker dough bakeable to a cracker which provides at least 20% of the U.S. R.D.A. of 1000 mg of calcium per 15 gram serving are:

| Sponge Ingredients | Parts by Weight |
|---|---|
| Wheat flour (about 13% by weight water) | 64 |
| Barley Malt flour (about 10% by weight water) | 0.3 |
| Yeast | 0.75 |
| Starter solution (protease and previous batch starter) | 1.8 |
| Water | 28.7 |
| TOTAL | 95.55 |

The sponge is formed by dumping the flours into an upright mixer. The remaining ingredients are added to a mixing tank and blended, then added to the flour in the upright mixer. The mixture in the upright mixer is blended, covered, and fermented or proofed for 10 to 14 hours.

Following this 10–14 hour fermentation, dough-up of the sponge may be effected with the following dough-up ingredients:

| Dough-Up Ingredients | Parts by Weight |
|---|---|
| Wheat flour (about 13% by weight water) | 36 |
| Soybean oil, purified | 7.5 |
| Minor ingredients (salt and sodium bicarbonate) | 2.53 |
| Sodium stearoyl lactylate | 0.25 |
| Ground limestone (food grade, at least 94% by weight calcium carbonate) | 5.625 |
| Polysorbate 60 | 0.125 |
| Natural flavorant | 0.375 |
| TOTAL | 52.405 |

| Topping Ingredients | Parts by weight |
|---|---|
| Salt | 3.0 |
| Soybean oil, purified | 2.5 |

The polysorbate 60 and natural flavorant are added to the top of the sponge, then the dough-up flour is added on top of this. The polysorbate 60 is added as a viscous liquid premix with the natural flavorant. The premix is commercially available as a natural flavor composition from Bush Boake Allen, Chicago, Illinois. In addition to the polysorbate 60 carrier, the natural flavor composition includes water, soybean oil, sesame oil, partially hydrogenated corn oil, TBHQ as an antioxidant, and sodium benzoate as a preservative. The premix has a white to off-white color and a fat-like flavor and odor.

The ground limestone (at least 94% by weight calcium carbonate) is a commercially available product produced by crushing, grinding and classifying naturally occurring limestone (calcite), benefited by flotation and/or air classification. It is a white to off-white, microcrystalline powder, odorless, tasteless and stable in air. It is insoluble in water and alcohol. It is soluble in dilute acetic acid, dilute hydrochloric acid and in nitric acid. The ground limestone, has a particle size distribution of: a) less than or equal to about 0.2% by weight retained on a 200 mesh U.S. Standard Sieve, and b) at least about 98% by weight, passing through a 325 mesh U.S. Standard Sieve.

The salt, sodium bicarbonate, ground limestone (calcium carbonate), and sodium stearoyl lactylate are added on top of the dough-up flour, followed by addition of the soybean oil. The dough is mixed, then proofed for 2–5 hours. The proofed dough is then sheeted, the sheeted dough is laminated, reduced in thickness between counter-rotating reduction rolls, and then cut into pieces using a rotary cutter. The cut pieces are baked to a moisture content of about 2.0% by weight to about 4.0% by weight and a pH of about 6.8 to 8.0. The topping salt and topping oil may then be applied to obtain the finished product.

EXAMPLE 2

The ingredients and their relative amounts, which may be used to produce a calcium enriched, fat-free, fermented cracker dough bakeable to a cracker which provides at least 20% of the U.S. R.D.A. of 1000 mg of calcium per 15 gram serving, are:

| Sponge Ingredients | Parts by Weight |
|---|---|
| Wheat flour (about 13% by weight water) | 64 |
| Barley Malt flour (about 10% by weight water) | 0.32 |
| Yeast | 0.1 |
| Starter solution (protease and previous batch starter) | 1 |
| Cracker meal | 2 |
| Water | 30.4 |
| TOTAL | 97.82 |

The sponge may be formed by dumping the flours into an upright mixer. The remaining ingredients may be added to a mixing tank and blended, then added to the flour in the upright mixer. The mixture in the upright mixer may be blended, covered, and fermented or proofed for 17 to 22 hours.

Following this 17–22 hour fermentation, dough-up of the sponge may be effected with the following dough-up ingredients:

| Dough-up Ingredients | Parts by Weight |
|---|---|
| Wheat flour (about 13% by weight water) | 36 |
| Ground limestone (calcium carbonate) of Example 1 | 5.625 |
| Liquid xylanase solution | 0.25 |
| Minor ingredients (salt and sodium bicarbonate) | 1.44 |
| Sodium stearoyl lactylate | 0.50 |
| Fluid unbleached soybean lecithin (acetone-insoluble matter about 62% minimum) | 0.125 |
| Polysorbate 60 | 0.25 |
| Natural flavorant | 0.75 |
| TOTAL | 44.94 |

The xylanase, lecithin, polysorbate 60 and natural flavorant may be added to the top of the sponge, then the dough-up flour may be added on top of this. The source of xylanase used may be PEN #3 liquid concentrate. It has an activity of about 10250±750 XAU per ml and is sold by Quest International Bioproducts Group, 1833 571h Street, Sarasota, Fla. The liquid xylanase solution may be prepared by admixing 1 part by weight of PEN liquid concentrate with 9 parts by weight of water. The amount of xylanase which would be added is equivalent to about 1162 XAU/lb flour, based on the manufacturer's colorimetric method as previously described for determining that activity. (XAU means xylanase activity units.) The polysorbate 60 may be added as a viscous liquid premix with the natural flavorant. The premix is commercially available as a natural flavor composition from Bush Boake Allen, Chicago, Ill. In addition to the polysorbate 60 carrier, the natural flavor composition includes water, soybean oil, sesame oil, partially hydrogenated corn oil, TBHQ as an antioxidant, and sodium benzoate as a preservative. The premix has a white to off-white color and a fat-like flavor and odor. The sodium stearoyl lactylate may be added on top of the dough-up flour, followed by addition of the salt, sodium bicarbonate, and ground limestone (calcium carbonate). The dough may be mixed, then proofed for 2–4 hours. The proofed dough may then be sheeted, the sheeted dough may be laminated, reduced in thickness between counter-rotating reduction rolls, and may then be cut into pieces using a rotary cutter. The cut pieces may be baked to a moisture content of about 2.5% by weight to about 4.0% by weight and a pH of about 7.0 to 8.4.

EXAMPLE 3

The ingredients and their relative amounts, which may be used to produce a 35%-reduced-fat, unfermented cracker which provides at leas mg of calcium per 15 gram serving, are:

| Dough Ingredients | Parts by weight |
| --- | --- |
| Wheat flour (about 13% by weight water) | 100 |
| Ground limestone (calcium carbonate) of Example 1 | 6.0 |
| Sucrose | 5.55 |
| Soybean oil, purified | 3.00 |
| Whey powder | 3.00 |
| Glucose syrup (43 BE/62 DE) | 1.78 |
| Minor ingredients (salt, butter flavor, amylase, protease) | 2.00 |
| Ammonium bicarbonate | 1.33 |
| Sodium bicarbonate | 0.33 |
| Sodium stearoyl lactylate | 0.50 |
| Fluid unbleached soybean lecithin (as in Example 2) | 0.125 |
| Polysorbate 60 | 0.25 |
| Natural flavorant (as in Example 1) | 0.75 |
| Water | 32.5 |
| TOTAL | 157.115 |

| Topping Ingredients | Parts by weight |
| --- | --- |
| Salt | 2.38 |
| Shortening (soybean spray oil) | 6.75 |

The dough may be formed by first creaming all the dough ingredients except the wheat flour, the amylase, protease, leavening agents, and a portion of the water. The polysorbate 60 and natural flavorant may be added as the commercially available premix of Example 1. The flour may be added to the creamed mixture, then the calcium carbonate and sodium bicarbonate may be sieved on top of the flour, followed by mixing. Then the protease and amylase enzymes and ammonium bicarbonate (each dispersed in a separate portion of the remaining water) may be added. The ingredients may be mixed, then proofed for 2–4 hours. The proofed dough may then be sheeted, laminated, reduced in thickness between counter-rotating rolls, cut into pieces with a rotary cutter, and baked to a moisture content of about 0.5% by weight to about 2.5% by weight and a pH of about 6.6 to 8.2. The topping ingredients may then be applied to obtain a finished calcium enriched cracker having a 35% reduction in fat content.

EXAMPLE 4

The ingredients and their relative amounts, which may be used to produce a calcium enriched, low-fat, fermented cracker dough bakeable to a cracker which provides at least of the U.S. R.D.A. of 1000 mg of calcium per 15 gram serving are:

| Sponge Ingredients | Parts by Weight |
| --- | --- |
| Wheat flour (about 13% by weight water) | 64 |
| Barley malt flour (about 10% by weight water) | 1.3 |
| Yeast | 0.75 |
| Starter solution (protease and previous batch starter) | 1.8 |
| Water | 29 |
| TOTAL | 96.85 |

The sponge is formed by dumping the flours into an upright or spindle mixer. The remaining ingredients are added to a mixing tank and blended, then added to the flour in the upright mixer. The mixture in the upright mixer is blended, covered, and fermented or proofed for 10 to 14 hours.

Following this 10–14 hour fermentation, dough-up of the sponge may be effected with the following dough-up ingredients:

| Dough-Up Ingredients | Parts by Weight |
| --- | --- |
| Wheat flour (about 13% by weight water) | 36 |
| Soybean oil, purified | 1.48 |
| Minor ingredients (salt and sodium bicarbonate) | 1.16 |
| Sodium stearoyl lactylate | 0.5 |
| Ground limestone (calcium carbonate) of Example 1 | 5.625 |
| Polysorbate 60 | 0.25 |
| Natural flavorant | 0.75 |
| TOTAL | 52.405 |

| Topping Ingredients | Parts by weight |
| --- | --- |
| Salt | 3.0 |
| Soybean oil, purified | 2.5 |

The polysorbate 60 and natural flavorant are added to the top of the sponge, then the dough-up flour is added on top of this. The polysorbate 60 is added as a viscous liquid premix with the natural flavorant. The premix is commercially available as a natural flavor composition from Bush Boake Allen, Chicago, Ill. In addition to the polysorbate 60 carrier, the natural flavor composition includes water, soybean oil, sesame oil, partially hydrogenated corn oil, TBHQ as an antioxidant, and sodium benzoate as a preservative. The premix has a white to off-white color and a fat-like flavor and odor.

The salt, sodium bicarbonate, ground limestone (calcium carbonate), and sodium stearoyl lactylate are added on top of the dough-up flour, followed by addition of the soybean oil. The dough is mixed, then proofed for 2-5 hours. The proofed dough is then sheeted, the sheeted dough is laminated, reduced in thickness between counter-rotating reduction rolls, and then cut into pieces using a rotary cutter. The cut pieces are baked to a moisture content of about 2.0% by weight to about 4.0% by weight and a pH of about 6.8 to 8.0. The topping salt and topping oil may then be applied to obtain the finished low-fat product.

What is claimed is:

1. A dough for producing a calcium enriched baked good which provides at least about 10% of the 1000 mg U.S. R.D.A. of calcium per 15 gram serving, the dough comprising flour, water, from about 3% by weight to about 30% by weight of a calcium component for providing at least about 10% of the U.S. R.D.A. of 1,000 mg. of calcium per 15 gram serving, said weight percentages of the calcium component being based upon the weight of said flour, and an emulsifier composition which reduces hardness and dry mouthfeel of said baked good caused by said calcium component, said emulsifier composition comprising: a) an effective emulsifying amount of at least one polyoxyethylene sorbitan fatty acid ester, and b) an effective emulsifying amount of at least one stearoyl lactylate, the amount of the emulsifier composition being from about 3% by weight to about 45% by weight, based upon the weight of said calcium component, and the moisture content of said dough being less than about 50% by weight based upon the weight of the dough.

2. A dough as claimed in claim 1 wherein said polyoxyethylene sorbitan fatty acid ester is polysorbate 60, and said stearoyl lactylate is sodium stearoyl lactylate.

3. A dough as claimed in claim 1 wherein the ratio of the weight of said at least one stearoyl lactylate to the weight of said at least one polyoxyethylene sorbitan fatty acid ester component is from about 4.65–0.5:1.

4. A dough as claimed in claim 1 wherein the ratio of the weight of said at least one stearoyl lactylate to the weight of said at least one polyoxyethylene sorbitan fatty acid ester component is from about 3.5–1.15:1, and the amount of the emulsifier composition is from about 5% by weight to about 15% by weight, based upon the weight of said calcium component.

5. A dough as claimed in claim 1 wherein said calcium component is calcium carbonate.

6. A dough as claimed in claim 1 wherein said calcium component provides at least 200 mg of calcium per 15 grams of said baked good.

7. A dough as claimed in claim 1 wherein the amount of said calcium component is from about 5% by weight to about 15% by weight, based upon the total weight of the flour.

8. A dough as claimed in claim 1 wherein said emulsifier composition further comprises an effective emulsifying amount of at least one lecithin.

9. A dough as claimed in claim 8 which is bakeable to a no-fat baked good.

10. A dough as claimed in claim 8 which is bakeable to a low-fat baked good.

11. A dough as claimed in claim 8 wherein said polyoxyethylene sorbitan fatty acid ester is polysorbate 60, said lecithin is fluidized soybean lecithin, and said stearoyl lactylate is sodium stearoyl lactylate.

12. A dough as claimed in claim 11 which is bakeable to a no-fat baked good and wherein the amount of polysorbate 60 is from about 20% by weight to about 40% by weight, the amount of lecithin is from about 10% by weight to about 25% by weight, and the amount of sodium stearoyl lactylate is from about 35% by weight to about 70% by weight, said percentages adding up to 100% by weight.

13. A dough as claimed in claim 1 wherein the fat content of the baked good is less than about 3.33% by weight, based upon the weight of the baked good.

14. A dough as claimed in claim 1 wherein said dough moisture content is less than about 35% by weight, based upon the weight of the dough.

15. A dough as claimed in claim 1 wherein said dough is a cracker dough having a moisture content of about 25% by weight to about 33% by weight, based upon the weight of the dough.

16. A dough as claimed in claim 1 wherein the calcium-enriched baked good has a moisture content of less than about 6% by weight based upon the weight of the baked good and starch gelatinization of the baked good is less than about 80%.

17. A cracker dough for producing a calcium enriched cracker which provides at least about 10% of the 1000 mg U.S. R.D.A. of calcium per 15 gram serving, the dough comprising flour, water, from about 3% by weight to about 30% by weight of a calcium component for providing at least about 10% of the U.S. R.D.A. of 1,000 mg. of calcium per 15 gram serving, said weight percentages of the calcium component being based upon the weight of said flour, and an emulsifier composition which reduces hardness and dry mouthfeel of said cracker caused by said calcium component, said emulsifier composition comprising:

a) an effective emulsifying amount of at least one polyoxyethylene sorbitan fatty acid ester, and b) an effective emulsifying amount of at least one stearoyl lactylate, the amount of the emulsifier composition being from about 3% by weight to about 45% by weight, based upon the weight of said calcium component, the ratio of the weight of said at least one stearoyl lactylate to the weight of said at least one polyoxyethylene sorbitan fatty acid ester component being from about 4.65–0.5:1, and the water content of said dough being less than about 50% by weight based upon the weight of the dough.

18. A cracker dough as claimed in claim 17 wherein said polyoxyethylene sorbitan fatty acid ester is polysorbate 60, and said stearoyl lactylate is sodium stearoyl lactylate.

19. A cracker dough as claimed in claim 17 wherein said calcium component comprises calcium carbonate.

20. A cracker dough as claimed in claim 17 wherein said calcium component provides at least 200 mg of calcium per 15 grams of said baked good.

21. A dough as claimed in claim 19 wherein the amount of said calcium carbonate is from about 5% by weight to about 15% by weight, based upon the total weight of the flour.

22. A calcium enriched cracker which provides at least about 20% of the 1000 mg U.S. R.D.A. of calcium per 15 gram serving, said cracker comprising flour, water, from about 3% by weight to about 30% by weight of calcium carbonate, said weight percentages of calcium carbonate being based upon the weight of said flour, and an emulsifier composition which reduces hardness and dry mouthfeel of said cracker caused by said calcium carbonate, said emulsifier composition comprising:

a) an effective emulsifying amount of at least one polyoxyethylene sorbitan fatty acid ester, and b) an effective emulsifying amount of at least one stearoyl lactylate, the amount of the emulsifier composition being from about 3% by weight to about 45% by weight, based upon the weight of said calcium carbonate, and the moisture content of said cracker being less than about 6% by weight.

23. A dough, for producing reduced-fat, low-fat or no-fat calcium enriched crackers which provide at least about 200 mg of calcium per 15 gram serving, comprising flour, water, from about 3% by weight to about 30% by weight of calcium carbonate, said weight percentages being based upon the weight of said flour, and effective amounts of polysorbate 60, lecithin, and sodium stearoyl lactylate, wherein the moisture content of the dough is less than about 50% by weight based upon the weight of the dough, the amount of polysorbate 60 is at least about 15% by weight, the amount of lecithin is at least about 5% by weight, and the amount of sodium stearoyl lactylate is at least about 20% by weight, said percentages of the emulsifiers adding up to 100% by weight.

24. A method for producing a calcium enriched baked good which provides at least about 10% of the 1000 mg U.S. R.D.A. of calcium per 15 gram serving, the method comprising admixing flour, water, from about 3% by weight to about 30% by weight of a calcium component for providing at least about 10% of the U.S. R.D.A. of 1,000 mg. of calcium per 15 gram serving, said weight percentages of calcium component being based upon the weight of said flour, and an emulsifier composition to form a machinable dough having a moisture content of less than about 50% by weight based upon the weight of the dough, said emulsifier composition reducing hardness and dry mouthfeel of said baked good caused by said calcium component, said emulsifier composition comprising:

a) an effective emulsifying amount of at least one polyoxyethylene sorbitan fatty acid ester, and b) an effective emulsifying amount of at least one stearoyl lactylate, the amount of the emulsifier composition being from about 3% by weight to about 45% by weight, based upon the weight of said calcium component, forming said dough into pieces, and baking said pieces to obtain a tender texture.

25. A method as claimed in claim 24 wherein said dough is sheeted, laminated, and then cut into pieces.

26. A method as claimed in claim 24 wherein said dough is formed into pieces by rotary-molding or by wire-cutting.

27. A method as claimed in claim 24 wherein said calcium component comprises calcium carbonate and said calcium carbonate provides at least 200 mg of calcium per 15 grams of said baked good.

28. A method for producing a reduced-fat, low-fat, or no-fat calcium enriched baked good having at least about 15% ungelatinized starch and which provides at least about 100 mg calcium per 15 gram serving, the method comprising admixing flour, water, a calcium component for providing at least about 10% of the U.S. R.D.A. of 1,000 mg. of calcium per 15 gram serving, and emulsifiers to form a machinable dough having a moisture content of less than about 50% by weight based upon the weight of the dough, wherein said emulsifiers comprise:

a) at least about 15% by weight of at least one polyoxyethylene sorbitan fatty acid ester, b) at least about 5% by weight of at least one lecithin, and c) at least about 20% by weight of at least one stearoyl lactylate, said weight percentages of emulsifiers adding up to 100% by weight, the amount of said calcium component being from about 3% by weight to about 30% by weight, based upon the weight of said flour, the total amount of said emulsifiers being from about 3% by weight to about 45% by weight of said calcium component, forming said dough into pieces, and baking said pieces to obtain a tender texture.

29. A method as claimed in claim 28 wherein said polyoxyethylene sorbitan fatty acid ester is polysorbate 60, said lecithin is fluidized soybean lecithin, said stearoyl lactylate is sodium stearoyl lactylate, and said calcium component comprises calcium carbonate.

30. A method as claimed in claim 29 wherein said dough is a cracker dough, and the cracker dough is sheeted, laminated, and then cut into pieces.

31. A method as claimed in claim 30 wherein a pentosanase enzyme is admixed with said flour to form said machinable dough.

32. A method as claimed in claim 30 wherein said dough is a fermented dough.

33. A method as claimed in claim 32 wherein said emulsifiers, said calcium component, and a pentosanase enzyme are added in the dough-up stage of producing the fermented dough.

34. A method as claimed in claim 33, wherein the dough is baked to obtain a low-fat cracker.

35. A method for producing calcium enriched soda crackers which provide at least about 200 mg of calcium per 15 gram serving comprising:

(a) admixing flour and water to form a sponge, (b) admixing flour, a calcium component for providing at least about 20% of the U.S. R.D.A. of 1,000 mg. of calcium per 15 gram serving, and an emulsifier composition with said sponge to form a machinable dough having a moisture content of less than about 50% by weight based upon the weight of the dough, the amount of said calcium component being from about 3% by weight to about 30% by weight, based upon the weight of said flour, said emulsifier composition reducing hardness and dry mouthfeel of said cracker caused by said calcium component said emulsifier composition comprising:

a) an effective emulsifying amount of at least one polyoxyethylene sorbitan fatty acid ester, and b) an effective emulsifying amount of at least one stearoyl lactylate, the amount of the emulsifier composition being from about 3% by weight to about 45% by weight, based upon the weight of said calcium component, (c) sheeting said dough, (d) cutting said sheeted dough into pieces, and (e) baking the pieces.

36. A method as claimed in claim 35 wherein the ratio of the weight of said at least one stearoyl lactylate to the weight of said at least one polyoxyethylene sorbitan fatty acid ester component is from about 3.5–1.15:1, the amount of the emulsifier composition is from about 5% by weight to about 15% by weight, based upon the weight of said calcium component, and said calcium component comprises calcium carbonate.

* * * * *